(12) United States Patent
Hanchinal et al.

(10) Patent No.: US 11,341,308 B2
(45) Date of Patent: *May 24, 2022

(54) METHOD AND LAYOUT OF AN INTEGRATED CIRCUIT

(71) Applicant: TAIWAN SEMICONDUCTOR MANUFACTURING COMPANY, LTD., Hsinchu (TW)

(72) Inventors: Mahantesh Hanchinal, Hsinchu (TW); Shu-Yi Ying, Hsinchu (TW); Chi Wei Hu, Hsinchu (TW); Min-Yuan Tsai, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/179,014

(22) Filed: Feb. 18, 2021

(65) Prior Publication Data

US 2021/0173996 A1 Jun. 10, 2021

Related U.S. Application Data

(60) Continuation of application No. 16/556,831, filed on Aug. 30, 2019, now Pat. No. 10,936,780, which is a (Continued)

(51) Int. Cl.
*G06F 30/392* (2020.01)
*G06F 30/398* (2020.01)
(Continued)

(52) U.S. Cl.
CPC .............. *G06F 30/392* (2020.01); *G03F 1/36* (2013.01); *G06F 30/398* (2020.01);
(Continued)

(58) Field of Classification Search
CPC ................. G06F 30/392; G06F 30/398; G06F 30/39447; G06F 30/3953; G06F 2119/18;
(Continued)

(56) References Cited

U.S. PATENT DOCUMENTS 5,255,156 A 10/1993 Chang
5,295,082 A 3/1994 Chang et al.
(Continued)

OTHER PUBLICATIONS

Fichtner et al., "VLSI CAD Tools and Applications", Kluwer Academic Publishers, 1987, 555 pages. (Year: 1987).

*Primary Examiner* — Phallaka Kik
(74) *Attorney, Agent, or Firm* — Hauptman Ham, LLP

(57) ABSTRACT

A method of manufacturing an integrated circuit includes generating a layout of a first and a second cell, adjusting a first spacing between an adjacent pair of routing tracks in a first set of routing tracks to be equal to a second spacing, adjusting a third spacing between an adjacent pair of routing tracks in a second set of routing tracks to be equal to a fourth spacing, placing a first pair of conductive patterns on the first set of routing tracks, placing a second pair of conductive patterns on the second set of routing tracks, forming a first set of conductive structures based on the first pair of conductive patterns, and forming a second set of conductive structures based on the second pair of conductive patterns. The first and second cell have a same cell height that is a non-integer multiple of a minimum pitch.

20 Claims, 7 Drawing Sheets

Related U.S. Application Data division of application No. 15/355,206, filed on Nov. 18, 2016, now Pat. No. 10,402,529.

(51) Int. Cl.

| | | |
|---|---|---|
| *G06F 30/3953* | (2020.01) | |
| *G06F 30/3947* | (2020.01) | |
| *G03F 1/36* | (2012.01) | |
| *H01L 21/027* | (2006.01) | |
| *H01L 21/768* | (2006.01) | |
| *H01L 21/76* | (2006.01) | |
| *G06F 119/18* | (2020.01) | |

(52) U.S. Cl.
CPC ...... *H01L 21/027* (2013.01); *H01L 21/76895* (2013.01); *G06F 30/3947* (2020.01); *G06F 30/3953* (2020.01); *G06F 2119/18* (2020.01); *Y02P 90/02* (2015.11)

(58) Field of Classification Search
CPC ..... G06F 30/3947; G03F 1/36; H01L 21/027; H01L 21/76895; Y02P 90/02
USPC ......... 716/119, 129, 130, 53, 54, 55; 703/14
See application file for complete search history.

(56) References Cited

U.S. PATENT DOCUMENTS

| | | |
|---|---|---|
| 6,329,845 B1 | 12/2001 | Taki |
| 8,421,205 B2 | 4/2013 | Yang |
| 8,661,389 B2 | 2/2014 | Chern et al. |
| 8,698,205 B2 | 4/2014 | Tzeng et al. |
| 8,826,212 B2 | 9/2014 | Yeh et al. |
| 8,836,141 B2 | 9/2014 | Chi et al. |
| 8,875,076 B2 | 10/2014 | Lin et al. |
| 9,147,029 B2 | 9/2015 | Ke et al. |
| 9,501,600 B2 | 11/2016 | Hsieh et al. |
| 10,402,529 B2 | 9/2019 | Hanchinal et al. |
| 10,936,780 B2 * | 3/2021 | Hanchinal ............ G06F 30/392 |
| 2008/0028352 A1 | 1/2008 | Birch et al. |
| 2011/0014060 A1 | 1/2011 | Bolcavage |
| 2011/0205457 A1 | 8/2011 | Sawaki |
| 2011/0205458 A1 | 8/2011 | Sawaki |
| 2013/0036396 A1 | 2/2013 | Arayama et al. |
| 2013/0077164 A1 | 3/2013 | Davis |
| 2014/0082248 A1 | 3/2014 | Shaikh et al. |
| 2014/0264924 A1 | 9/2014 | Yu et al. |
| 2014/0282289 A1 | 9/2014 | Hsu et al. |
| 2014/0346662 A1 | 11/2014 | Rashed |
| 2015/0279453 A1 | 10/2015 | Fujiwara et al. |
| 2015/0318241 A1 | 11/2015 | Chang et al. |
| 2015/0347659 A1 | 12/2015 | Chiang et al. |
| 2015/0357279 A1 | 12/2015 | Fujiwara et al. |
| 2016/0012169 A1 | 1/2016 | Chiang et al. |
| 2018/0225885 A1 | 8/2018 | Dishno |

* cited by examiner

| N \ M | 1 | 2 | 3 | 4 |
|---|---|---|---|---|
| 2 | MP, MP+1 | MP, MP+2 | MP, MP+3 | MP, MP+4 |
| 3 | MP, MP+1, MP+2 | MP, MP+2, MP+4 | MP, MP+3, MP+6 | MP, MP+4, MP+8 |
| 4 | MP, MP+1, MP+2, MP+3 | MP, MP+2, MP+4, MP+6 | MP, MP+3, MP+6, MP+9 | ... |
| 5 | MP, MP+1, MP+2, MP+3, MP+4 | MP, MP+2, MP+4, MP+6, MP+8 | ... | ... |

FIG.3

METHOD AND LAYOUT OF AN INTEGRATED CIRCUIT

PRIORITY CLAIM

The present application is a continuation of U.S. application Ser. No. 16/556,831, filed Aug. 30, 2019, now U.S. Pat. No. 10,936,780, issued Mar. 2, 2021, which is a divisional of U.S. application Ser. No. 15/355,206, filed Nov. 18, 2016, now U.S. Pat. No. 10,402,529, issued Sep. 3, 2019, which are incorporated herein by reference in their entireties.

BACKGROUND

In a design of an integrated circuit, various cells having predetermined functions are used. Pre-designed layouts of standard cells or memory cells are stored in cell libraries. During the integrated circuit design process, the pre-designed layouts of the standard cells are retrieved from the cell libraries and placed at selected locations in an integrated circuit layout. Routing is then performed to connect components of the standard cells with each other using interconnect lines. Next, an optical proximity correction (OPC) is performed and a set of masks are generated to manufacture the integrated circuit using semiconductor manufacturing processes.

Because of the complexity of various designs, an electronic design automation (EDA) tool is used to simulate and verify the integrated circuits at various levels of abstraction under the direction of a designer, in some instances. From design to mask fabrication, the EDA tool performs various tasks, such as design rule checking, layout versus schematic checking, layout parasitic extraction and resistance-capacitance (RC) extraction.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a table of a predetermined number of pitch options in accordance with some embodiments.

DETAILED DESCRIPTION

Figure 1:
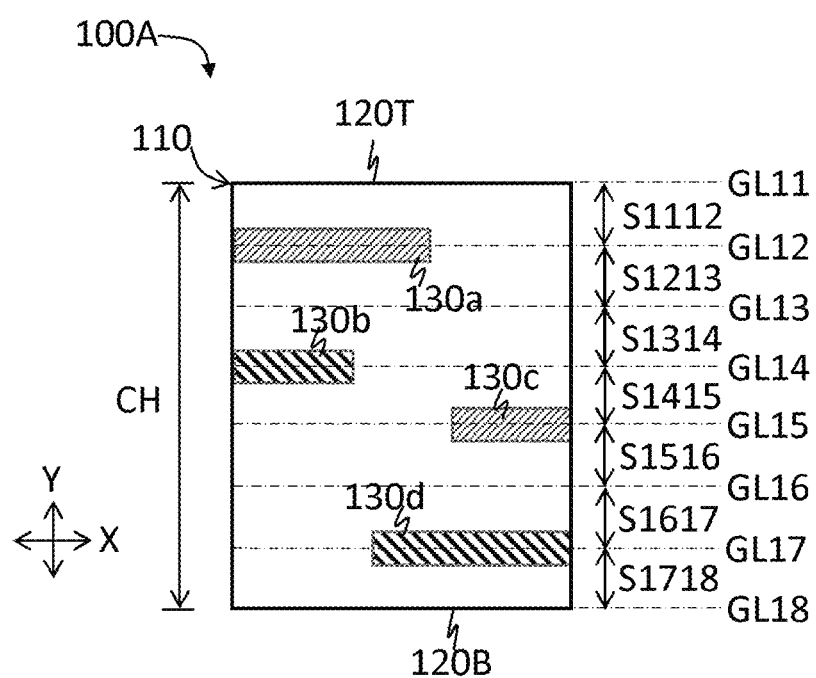
FIG. 1 is a top view of a layout of a cell in an integrated circuit in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

An integrated circuit includes, in some instances, a memory cell array and/or standard cells. The memory cell array includes a plurality of memory cells arranged in rows and columns. In some embodiments, a memory cell includes a transistor-based bi-stable latch that is either in an 'on' state or an 'off' state. The memory cells in each column are coupled to at least one bit line for writing data to or reading data from the memory cells. The memory cells in each row are coupled to a word line for selecting a writing or reading operation. In some embodiments, the memory cell array includes one or more control lines extending along one or more columns or rows for controlling different operations of the memory cells.

Standard cells include functional cells and non-functional cells, i.e., engineering change order (ECO) cells, for various applications. A functional cell is designed to perform a specific function such as a logic function or a storage function. An ECO cell is designed without a specific function, but is programmable to provide a specific function. During an integrated circuit design, designed layouts of one or more functional cells are read out from cell libraries and are placed into an initial layout. In some embodiments, neighboring cells are abutted to each other.

A place and route electronic design automation (EDA) tool is used to generate the initial layout for a mask to be used to form one or more circuit patterns of a semiconductor device. During the operation of the EDA tool, one or more virtual grid lines are arranged in parallel with each other in the standard cell. The virtual grid lines extend across an entirety of the layout which includes the standard cell. The virtual grid lines in neighboring cells are continuous. Routing is performed to connect the functional cells by using one or more interconnect patterns placed on the virtual grid lines. Each pattern extends along a single virtual grid line. The layout also includes one or more ECO cells disconnected from the functional cells. When the layout is revised because of a functional violation or a timing violation, one or more ECO cells are programed to provide an intended function and are connected to the functional cells by one or more interconnect patterns placed on the virtual grid lines. As a result, the design cycle time is shortened and mask changes are reduced in comparison with other approaches.

In some embodiments, the interconnect patterns in abutted standard cells are symmetric along a cell height direction. In some embodiments, a plurality of spacings between adjacent virtual grid lines in the standard cell is symmetric along the cell height direction. At least one spacing of the plurality of spacings is different from another spacing of the plurality of spacings in the standard cell. As a result of the symmetry, the cost and time of designing the layout and/or manufacturing the integrated circuit (IC) are reduced, and a density of the IC is increased. In at least one embodiment, the interconnect patterns correspond to conductive lines or via plugs in a semiconductor manufacturing process.

FIG. 1 is a top view of a layout 100A of a cell 110 in an integrated circuit in accordance with some embodiments. In some embodiments, cell 110 is a standard cell. Cell 110 includes, but is not limited to, an INV, AND, OR, NAND, NOR, XOR, AOI, OAI, MUX, BUFF, adder, filler, flip-flop, latch, delay, clock cell, or the like. Layout 100A has a plurality of virtual grid lines GL11-GL18, collectively referred to as virtual grid lines GL, extending in a direction X and cell 110 has a cell height CH along a direction Y perpendicular to direction X. Cell 110 includes a top boundary 120T and a bottom boundary 120B. Cell height CH is defined as a distance from top boundary 120T to bottom boundary 120B. Virtual grid lines GL, also referred to as routing tracks, are spaced from each other along cell height CH from top boundary 120T to bottom boundary 120B and are used for facilitating the placement and routing process in which conductive patterns are placed for interconnecting components of the layout. In some embodiments, direction Y is parallel with a longitudinal axis of gate structures of the IC. In some embodiments, direction Y is perpendicular to the longitudinal axis of gate structures of the IC.

In some embodiments, cell 110 is used in a single-height-cells-in-single-row layout design. In the layout design of single-height cells, a plurality of cells with the same cell height CH are abutted and arranged in a row, and the virtual grid lines in each cell are consecutive and in parallel with each other. The row extends along direction X. In some embodiments, according to the complexity of the integrated circuits, in a single-height-cells-in-single-row layout design, one or more rows are arranged in a two-dimensional (2-D) array. In some embodiments, cell 110 is used in a mixed-height-cells-in-single-row layout design. In the layout design of mixed-height cells, a plurality of cells with different cell heights are abutted and arranged in a row. Each cell height is an integral multiple of standard cell height CH. Still, the virtual grid lines in each abutted cells are consecutive and in parallel with each other. Compared with the single-height-cells-in single-row layout design, the multi-height-cells-in-single-row layout design has a more efficient area use.

Figure 4:
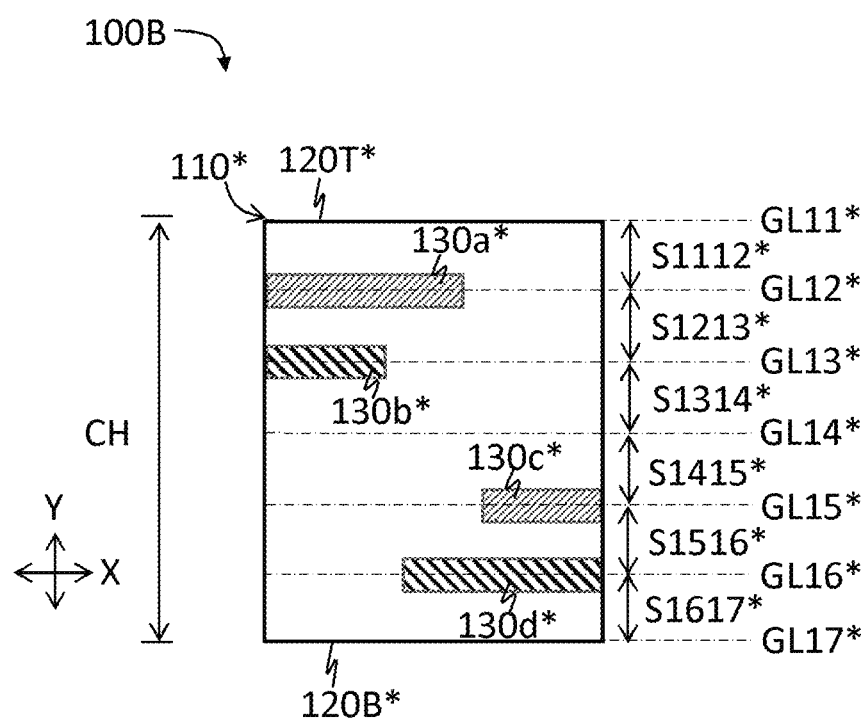
FIG. 4 is a top view of a layout of a cell in an integrated circuit in accordance with some embodiments.

In some embodiments, cell 110 has an even number of virtual grid lines GL extending in parallel with each other and extending along direction X and an odd number of spacings S1112-1718, collectively referred to as spacings S, between adjacent virtual grid lines GL. In some embodiments, cell 110 includes an odd number of virtual grid lines GL and an even number of spacings S. FIG. 4 includes an example of a cell having an odd number of virtual grid lines GL and an even number of spacings S. Virtual grid lines GL extend through an entirety of the layout design. In the EDA tool, conductive patterns are arranged (also known as placing-and-routing) along virtual grid lines GL. Because cell height CH is a non-integral multiple of a minimum pitch MP of a predetermined manufacturing process, when spacings S are uniform, at least one of virtual grid line GL11 or GL18 will fail to align with boundaries, e.g., top boundary 120T or bottom boundary 120B, of cell 110. As a result, a risk of violating the design rule of minimum pitch MP at a location where two neighboring cells abut is increased. In addition, inconsistency and difficulty of pattern coloring are increased. In order to help ensure that virtual grid line GL11 is aligned with top boundary 120T and that GL18 is aligned with bottom boundary 120B, a magnitude of each of spacings S is arranged in a way that at least one of spacings S is different from at least another of spacings S. This adjustment to the spacings S accounts for the non-integral multiple relationship between cell height CH and minimum pitch MP. In some embodiments where spacings S were previously set to be equal to minimum pitch MP, at least one spacing of spacings S is increased.

Figure 2A:
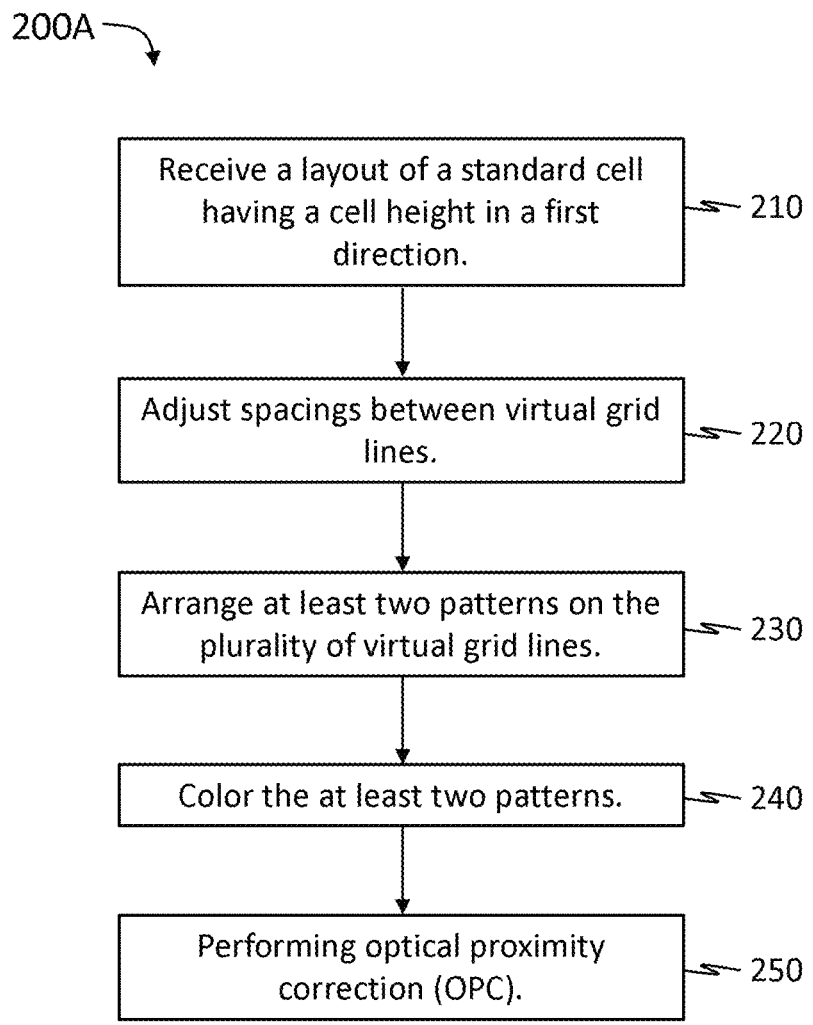
FIG. 2A is a flow chart of a method of designing an integrated circuit layout in accordance with some embodiments.

FIG. 2A is a flow chart of a method 200A of designing an integrated circuit layout in accordance with some embodiments. One of ordinary skill in the art would understand that additional operations are able to be performed before, during, and/or after method 200A depicted in FIG. 2A, in some embodiments. Method 200A includes operation 210 in which a layout of a standard cell having a cell height in a first direction is received. A hardware computer receives the layout of the standard cell. In some embodiments, the layout is received from a layout generator, a user or another suitable external device. In some embodiments, the layout is generated using a same system as that which executes method 200A. The layout is usable to manufacture an integrated circuit by using a manufacturing process and the layout is designed based on a set of design rules in various layers such as well regions, active regions, polysilicon structures, contact plugs, conductive lines, vias, or the like. The set of design rules of the predetermined manufacturing process has a minimum pitch which is used to determine a minimum distance between edges of patterns disposed end-to-end, a minimum distance between parallel adjacent patterns, and/or a minimum distance between corners of adjacent patterns.

Method 200A continues with operation 220 in which a spacing between adjacent virtual grid lines is adjusted. In some embodiments, because the cell height is determined based on various manufacturing processes of each layer and area use, the cell height may be a non-integral multiple of the minimum pitch. When the virtual grid lines are arranged according to the minimum pitch, patterns will be asymmetric to each other every two rows, in some instances. The spacing between adjacent virtual grid lines is adjusted to satisfy the minimum pitch of the predetermined manufacturing process and to align a first virtual grid line with a top boundary of the cell and a second virtual grid line with a bottom boundary of the cell. In accordance with such spacing, patterns will be symmetric to each other every two rows.

Figure 2B:
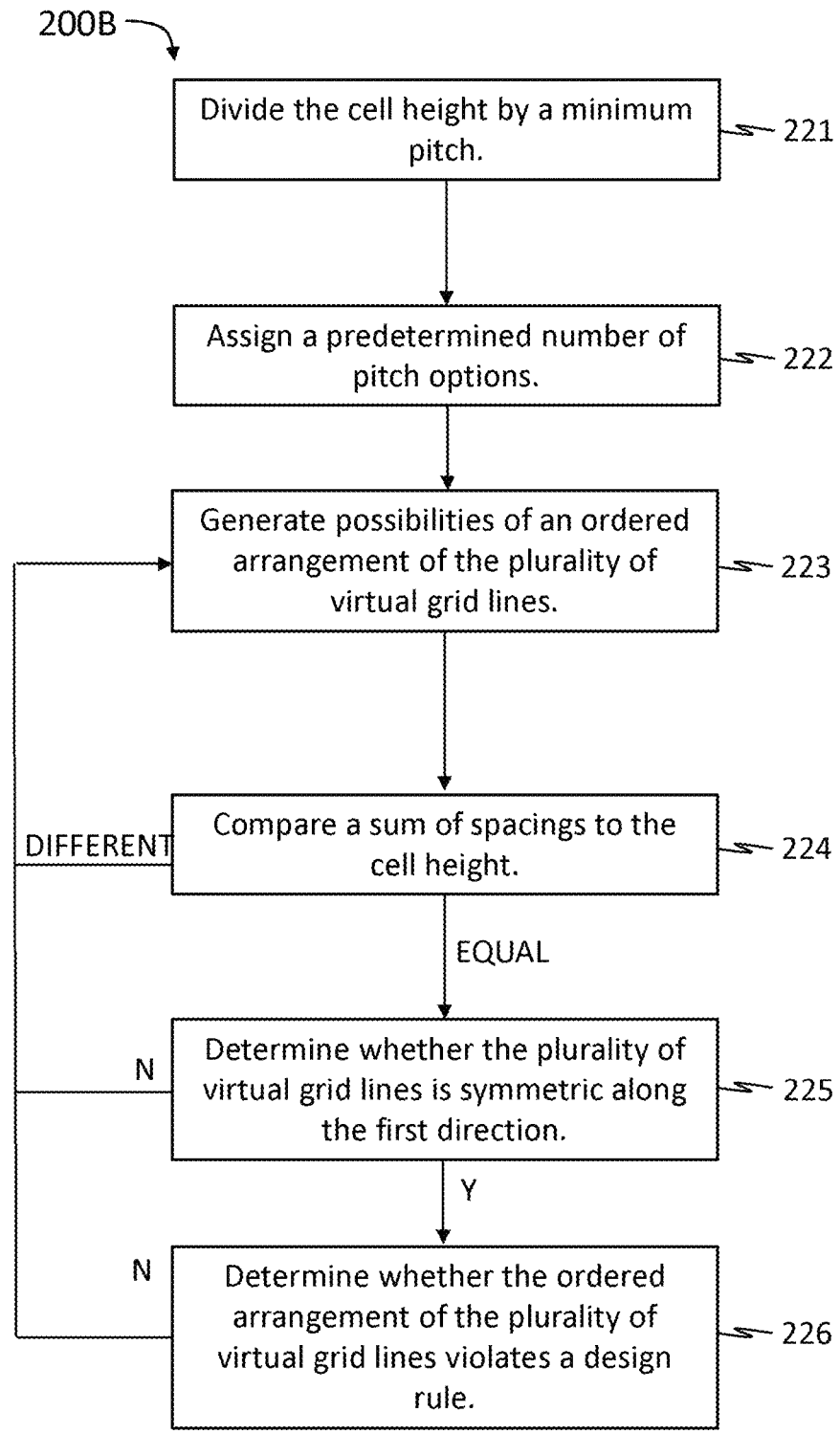
FIG. 2B is a flow chart of a method of adjusting virtual grid lines in accordance with some embodiments.

FIG. 2B is a flow chart of a method 200B of adjusting virtual grid lines in accordance with some embodiments. One of ordinary skill in the art would understand that additional operations are able to be performed before, during, and/or after method 200B depicted in FIG. 2B, in some embodiments. Because spacing is determined by a minimum pitch MP, method 200B includes operation 221 in which the cell height is divided by minimum pitch MP. The quotient is a mixed number because cell height is a non-integral multiple of the minimum pitch. The whole number L of the quotient is used to determine the quantity of spacings as well as virtual grid lines.

In some embodiments, a ratio of cell height CH to minimum pitch MP is p/q, and p and q are positive integers. In some embodiments, the ratio ranges from about 4 to about 17. If the ratio is too small, a number of virtual grid lines available for interconnect patterns will be insufficient to connect components of the IC layout, in some instances. If the ratio is too great, a drive current for a cell, e.g., cell 110 (FIG. 1), will be increased, resulting in a higher power consumption, in some instances.

In some embodiments, minimum pitch MP is determined based on a minimum pitch which is reliably creatable using a lithography process or etching process used for patterning a conductive pattern. Cell height CH is divided by L spacings. Whole number L is a positive integer equal to or greater than 4. In some embodiments, whole number L ranges from 4 to 16. In some embodiments, whole number L is greater than 16.

Method 200B continues with operation 222 in which a predetermined number of pitch options is assigned. In some embodiments, pitch options for spacings between adjacent virtual grid lines are selected based on an arithmetic sequence by adding minimum pitch MP, also referred as to the initial element, to a predetermined common difference M. In some embodiments, a predetermined number N of pitch options are assigned. In some embodiments, common difference M and/or number N is provided by a user. In some embodiments, common difference M and/or number N is determined based on empirical data. In some embodiments, number N is a positive integer ranging from about 2 to about 5. If number N is too great, a process time of the EDA tool will be increased because of an increased amount of data to be processed, in some instances. If number N is equal to 1, there will be insufficient solutions to adjust the spacings of the virtual grid lines, in some instances. Common difference M is a positive integer equal to or greater than 1. In some embodiments, common difference M is determined based on a relationship between minimum pitch MP and a cell height. As a result, a magnitude of each pitch option for the spacings is equal to or greater than minimum pitch MP.

FIG. 3 is a table of the predetermined number of pitch options in accordance with some embodiments. In some embodiments, common difference M ranges from 1 to 4. If common difference M is too great, the number of virtual grid lines will be reduced, resulting in insufficient routing options for interconnection, in some instances. In some embodiments, the arithmetic sequence begins from setting number N as 2 and setting common difference M as 1. For example, in at least one embodiment, when cell height CH is 300 nanometers (nm) and minimum pitch MP is 40 nm, assuming predetermined number N is 3 and common difference M is 2, the pitch option is selected as {40 nm, 42 nm, 44 nm}.

Method 200B continues with operation 223 in which possibilities of an ordered arrangement of the plurality of virtual grid lines are generated based on the number N of pitch options and the whole number L.

Because a repetition of N pitch options for L spacings is allowed, the possibilities of the ordered arrangement of the virtual grid lines is $N^L$. Further, because cell height CH is a non-integral multiple of minimum pitch MP and common difference M is equal to or greater than 1, the possibilities of a uniform spacing are able to be removed. Accordingly, N possibilities are removed so that there are $(N^L-N)$ different possibilities. Removing the N possibilities helps to reduce processing time for the EDA tool. After the pitch options for spacings are generated from $(N^L-N)$ possibilities of the ordered arrangement of virtual grid lines, a size of a solution set is reduced by eliminating pitch options that fail to meet certain criteria.

Method 200B continues with operation 224 in which a sum of spacings is compared to the cell height. In order for the virtual grid lines to be aligned with both the top boundary and the bottom boundary of the cell, the sum of the spacings is equal to the cell height. For example, in FIG. 1 to have virtual grid line GL11 align with top boundary 120T and virtual grid line GL18 align with bottom boundary 120B, a sum of spacings S equals cell height CH. In some embodiments, because a distance between virtual grid lines GL11 and GL18 defines cell height CH, possibilities that have a sum of spacings different from cell height CH are excluded. If the sum of spacings in all possible pitch options is different from cell height CH, method 200B returns to operation 223 and a value of predetermined number N and/or common difference M is changed. If at least one possibility of pitch options has a sum of spacings S equal to cell height CH, method 200B proceeds to operation 225.

Method 200B continues with operation 225 in which whether the plurality of virtual grid lines is symmetric along the predetermined direction is determined. In the at least one embodiment in FIG. 1, cell 110 has an odd number of spacings, so pairs of spacings S1112/S1718, S1213/S1617 and S1314/S1516 are symmetric about a center line of spacing S1415. If virtual grid lines GL are not symmetric to each other along direction Y, method 200B returns to operation 223 and a value of predetermined number N and/or common difference M is changed. If virtual grid lines GL are symmetric to each other along direction Y, method 200B proceeds to operation 226.

Method 200B continues with operation 226 in which whether the ordered arrangement of the plurality of virtual grid lines violates a design rule is determined. In some embodiments, even though a spacing between two adjacent conductive patterns satisfies the minimum pitch MP, due to a limitation of the manufacturing process, the spacing is undesirable when the two adjacent conductive patterns are formed using different masks. Such violation is also referred to as a forbidden spacing issue, in some instances. Because the arrangement of the plurality of virtual grid lines should meet all design rules, if a design rule is violated, method 200B returns to operation 223 and a value of predetermined number N and/or common difference M is changed. If no violation is detected, method 200B permits method 200A to proceed to operation 230. In some embodiments, if all generated possibilities fail to satisfy operation 230, the process will stop or an indication of no available possibilities will be generated. For example, in at least one embodiment, when cell height CH is 300 nm and minimum pitch MP is 40 nm, cell height CH is a non-integer multiple (7.5) of minimum pitch MP and whole number L is 7. Assuming predetermined number N is 4 and common difference M is 1, one generated possibility satisfying operations 224-226 is selected as {43 nm, 43 nm, 43 nm, 42 nm, 43 nm, 43 nm, 43 nm}.

In some embodiments, at least one of operations 224-226 is implemented simultaneously with another of operations 224-226. In some embodiments, operations 224-226 are implemented sequentially, before or after each other, in various orders. In some embodiments, when more than one possibility of the ordered arrangement are obtained, the user will select one possibility based on a different design requirement. For example, a possibility with a largest number of virtual grid lines for providing a maximum number of options to connect components of the IC layout, in some instances.

Returning to FIG. 2A, method 200A continues with operation 230 in which at least two conductive patterns are arranged on the plurality of grid lines. The arrangement of one or more conductive patterns, also referred to as interconnect structures, includes placement and routing. The placement involves deciding where to place the components of semiconductor devices of the cell. Routing involves connecting each of the placed component with conductive patterns while following the rules and limitations of the manufacturing/design process. In some embodiments, the placement and routing use a minimum spanning tree (MST) algorithm to find the minimum number of conductive patterns to make a connection. In some embodiments, the placement and routing use a greedy method to select the virtual grid lines for each of the conductive patterns for connecting the semiconductor devices.

In the at least one embodiment in FIG. 1, cell 110 includes semiconductor devices formable using a manufacturing process and includes conductive patterns (also referred to as polygons) 130a-d, collectively referred to as conductive patterns 130, separated from each other along direction Y. Conductive patterns 130 are used for electrically connecting semiconductor devices of cell 110 to other semiconductor devices of cell 110 and to semiconductor devices outside of cell 110. In some embodiments, cell 110 includes one or more conductive patterns other than conductive patterns 130. In some embodiments, conductive patterns 130 have a rectangular shape. In some embodiments, conductive patterns 130 have a vertex (angle). Each of conductive patterns 130 is arranged according to virtual grid lines GL. In some embodiments, center lines of conductive patterns 130 are aligned with one of virtual grid lines GL. In some embodiments, a center line of at least one conductive pattern 130 is offset from a corresponding virtual grid line GL due to design variation. In some embodiments, one or more conductive patterns 130 overlaps at least one boundary of cell 110. In some embodiments, the predetermined manufacturing process is a back end of line (BEoL) process and conductive patterns 130 correspond to conductive lines or conductive vias. In some embodiments, the conductive lines in a pin layer of cell 110 serve as ports or points for connection to elements outside of cell 110. In some embodiments, cell 110 includes a multi-layer structure with a pin layer at an upper-most layer for connection with other cells in the same circuit block or other cells in a different circuit block. In some embodiments, the pin layer of cell 110 used for connecting is formed in metal structures close to the gate structure. In some embodiments, the conductive patterns are formed in a second level metal (M2) layer and/or a fourth level metal (M4) layer manufacturing process. In some embodiments, the conductive patterns are formed in a first level metal (M1) layer and a third level metal (M3) layer manufacturing process. In at least one embodiment, in a physical device manufactured based on layout 200A, the conductive patterns are formed of aluminum, copper or copper alloys, and the conductive lines are isolated by an inter-metal dielectric material. In some embodiments, the conductive lines extend in direction Y and perpendicular to an extension of pre-layer metal lines and/or an extension of post-layer metal lines.

Returning to FIG. 2A, method 200A continues with operation 240 in which the at least two patterns are colored. In some embodiments, in order to enhance photolithographic resolution in the integrated circuits, a multiple exposure methodology is applied to help prevent short circuits caused by the optical proximity effect. Patterns which are capable of being decomposed for multiple exposure methodology are colorable. In some embodiments, a double exposure involves forming patterns on a single layer of a substrate using two different masks in succession. As a result, a minimum line spacing in the combined pattern is reduced while maintaining sufficient resolution to reliably form the conductive patterns. In a method referred to as double dipole lithography (DDL), the patterns to be formed on the layer are decomposed and formed on a first mask having only horizontal lines, and on a second mask having only vertical lines. The first and second masks are said to have 1-dimensional (1-D) patterns. Another form of double exposure is referred to as double patterning technology (DPT). Unlike DDL, DPT in some cases permits a vertex to be formed of a vertical segment and a horizontal segment on the same mask. Thus, DPT generally allows for greater reduction in overall integrated circuit layout than DDL does. DPT is a layout splitting method analogous to a two coloring problem for layout splitting in graph theory. Two adjacent patterns are assigned different colors. Only two color types are assigned. Each pattern on the layer is assigned to a first color or a second color. The patterns of the first color are formed by a first mask, and the patterns of the second color are formed by a second mask. In some embodiments, operation 140 involves two or three different masks. In some embodiments, however, if the EDA tool is equipped with a set of default design rules without considering the optical proximity effect, operation 240 is omitted. In some embodiments, each virtual grid line GL is assigned a specific color during operation 240. In the at least one embodiment in FIG. 1, conductive patterns 130a and 130c are assigned a first color, and conductive patterns 130b and 130d are assigned a second color. In some embodiments, each of conductive patterns 130 is assigned a different color. Method 200A is not limited to two colors. In some embodiments, operation 240 includes assigned colors according to a triple patterning arrangement, a quadruple patterning arrangement or another suitable patterning arrangement.

Returning to FIG. 2A, method 200A continues with operation 250 in which an optical proximity correction (OPC) is performed. In some embodiments, a design rule check (DRC) verification is performed before the OPC. During the DRC verification, to identify whether two cells are routable, design constraints of connection between the cells are taken into consideration. The design constraints include limitations on speed and spacing for cells to be connected.

The OPC is applied to layout 100A to take into account photolithographic variations/irregularities which are expected to be encountered during manufacturing. In some embodiments, when a width of one of conductive patterns 130 or a distance between conductive patterns 130 is narrower than a predetermined lithography threshold, the OPC generates extra polygons, such as hammerhead patterns, that are to be included in one or more masks used to fabricate layouts 100A. After operation 250, layout 100A is then used to generate one or more masks for the fabrication process to transfer conductive patterns 130 onto a layer of an actual wafer.

In some embodiments, additional operations are included in method 200A, such as Layout Versus Schematic (LVS) verification, Layout Parameter Extraction (LPE), and parasitic Resistance-Capacitance Extraction (RCX), or other suitable operations. In some embodiments, an order of operations for method 200A is modified. In some embodiments, multiple operations for method 200A are performed simultaneously. For example, operation 240 and operation 250 are performed simultaneously, in some instances. In some embodiments, at least one of operation 221-226 from method 200B is combined with an operation from method 200A.

FIG. 4 is a top view of a layout 100B of cell 110* in the integrated circuit in accordance with some embodiments. Cell 110* is similar to cell 110, like elements have a same reference number with a star symbol. Compared with cell 110, cell 110* has an odd number of virtual grid lines GL11*-17*, collectively referred to as virtual grid lines GL*, and an even number of spacings S1112*-1617* collectively referred to as spacings S*. Similarly, a magnitude or size of each of spacing S* is arranged in a way that at least one of spacings S* is different from at least another of spacings S*.

Figure 5:
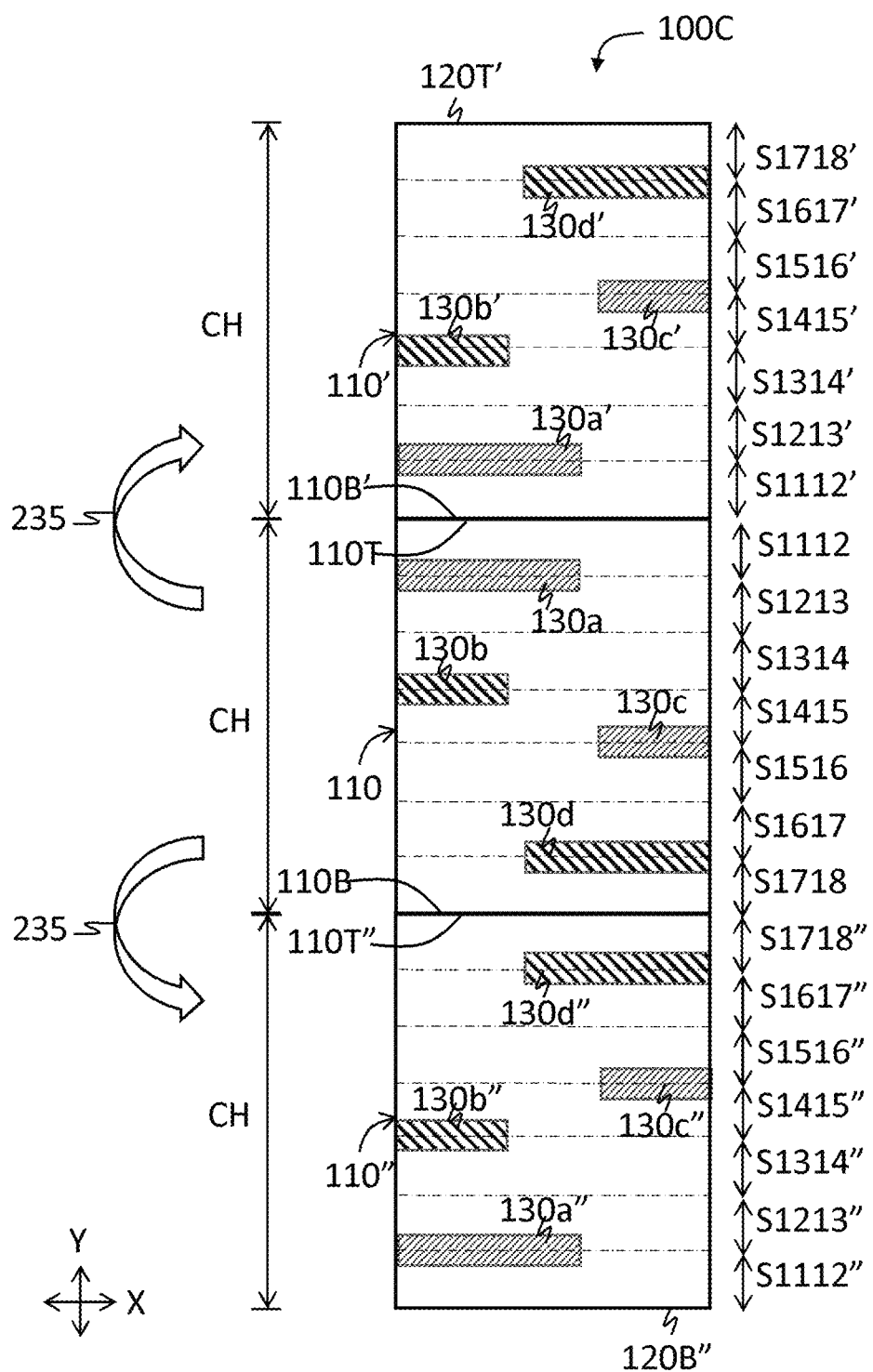
FIG. 5 is a top view of a layout of a plurality of cells in an integrated circuit in accordance with some embodiments.

FIG. 5 is a top view of a layout 100C of a plurality of cells 110, 110' and 110" in the integrated circuit in accordance with some embodiments. Cells 110' and 110" are similar to cell 110, like elements have a same reference number with a prime symbol or a double prime symbol. Cells 110-110" have same cell heights CH. Further, cells 110' and 110" are processed with a symmetry operation 235, respectively. Symmetry operation 235 is referred to as a mirroring, flipping, or rotating operation. In cells 110 and 110', top boundary 120T aligns with bottom boundary 120B' to form a symmetric axis so that spacings S are symmetric to spacings S' along direction Y. Similarly, in cells 110 and 110", bottom boundary 120B aligns with top boundary 120T" to form another symmetric axis so that spacings S are symmetric to spacings S" along direction Y. Because top boundaries 120T-T" and bottom boundaries 120B-B" align with one of the virtual grid lines, conductive patterns 130 are symmetric to conductive patterns 130' and conductive patterns 130". As a result, conductive patterns 130' and conductive patterns 130" are assigned colors in a same way assigned to conductive patterns 130. In some embodiments, a set of different masks are made by using layout information extracted from layout 100C and a photolithographic process is used to transfer the layout information from the different masks to a silicon wafer. By adjusting virtual grid lines symmetric along cell height, method 200A and/or method 200B generates layout designs 100A-C of integrated circuit devices with less cell displacement, higher routing density, more uniform coloring, easier legalization (i.e., being placed in non-overlapping site-aligned locations) and lower manufacturing cost of masks than other approaches.

Figure 6:
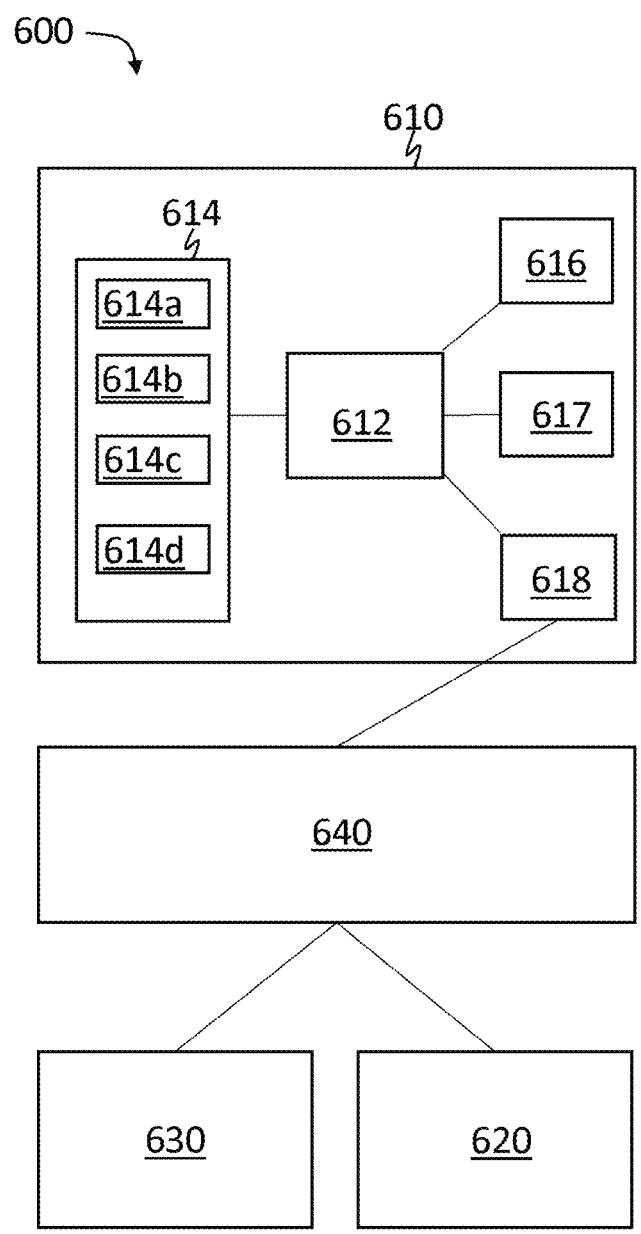
FIG. 6 is a functional block diagram of an integrated circuit designing system in accordance with one or more embodiments.

FIG. 6 is a functional block diagram of an integrated circuit designing system 600 in accordance with one or more embodiments. Integrated circuit designing system 600 includes a first computer system 610, a second computer system 620, a networked storage device 630, and a network 640 connecting first computer system 610, second computer system 620, and networked storage device 630. In some embodiments, one or more of second computer system 620, networked storage device 630, and network 640 are omitted.

First computer system 610 includes a hardware processor 612 communicatively coupled with a non-transitory, computer readable storage medium 614 encoded with, i.e., storing, a generated integrated layout 614a, a circuit design 614b, and a computer program code 614c, i.e., a set of executable instructions. Hardware processor 612 is communicatively coupled to computer readable storage medium 614. Hardware processor 612 is configured to execute a set of instructions 614c encoded in computer readable storage medium 614 in order to cause first computer system 610 to be usable as a placing and routing tool for performing a portion or all of operations 110-150 as depicted in FIGS. 1A-B. In some embodiments, hardware processor 612 is configured to execute set of instructions 614c for generating an integrated circuit layout based on the layout of the cell and the minimum pitch corresponding to a predetermined semiconductor manufacturing process. In some embodiments, hardware processor 612 is a central processing unit (CPU), a multi-processor, a distributed processing system, an application specific integrated circuit (ASIC), and/or a suitable processing unit.

In some embodiments, computer readable storage medium 614 is an electronic, magnetic, optical, electromagnetic, infrared, and/or a semiconductor system (or apparatus or device). In some embodiments, computer readable storage medium 614 includes a semiconductor or solid-state memory, a magnetic tape, a removable computer diskette, a random access memory (RAM), a read-only memory (ROM), a rigid magnetic disk, and/or an optical disk. In some embodiments using optical disks, computer readable storage medium 614 includes a compact disk-read only memory (CD-ROM), a compact disk-read/write (CD-R/W), and/or a digital video disc (DVD).

In some embodiments, storage medium 614 stores computer program code 614c configured to cause first computer system 610 to perform method 200A and/or method 200B as depicted in FIGS. 1A-B. In some embodiments, storage medium 614 also stores information needed for performing method 200A and/or 100B or generated during performing method 200A and/or 100B, such as integrated circuit layout 614a, circuit design 614b, and/or a cell library 614d including layouts 200A-C of cells 210, 210*, 210' and 210".

First computer system 610 includes an input/output interface 616 and a display unit 617. Input/output interface 616 is coupled to hardware processor 612 and allows a circuit designer to manipulate first computer system 610 in order to perform methods 100A-B. In at least some embodiments, display unit 617 displays the status of operation of methods 100A-B in a real-time manner and preferably provides a Graphical User Interface (GUI). In some embodiments, input/output interface 616 and display unit 617 allow an operator to operate first computer system 610 in an interactive manner.

In some embodiments, first computer system 610 further includes a network interface 618 coupled to hardware processor 612. Network interface 618 allows first computer system 610 to communicate with network 640, to which one or more other computer systems 620 and networked storage device 630 are connected. Network interface 618 includes wireless network interfaces such as BLUETOOTH, WIFI, WIMAX, GPRS, or WCDMA; or wired network interface such as ETHERNET, USB, or IEEE-1394. In some embodiments, method 200A and/or method 200B is implemented in two or more computer systems 610 and 620 and/or networked storage device 630, and information such as integrated circuit layout 614a, circuit design 614b, computer program code 614c and cell library 614d are exchanged between different computer systems 610 and 620 and/or networked storage device 630 via network 640.

One aspect of this description relates to a method of manufacturing an integrated circuit. The method includes generating a layout of a first cell and a second cell, the first cell abutting the second cell in a first direction, the first cell having a first set of routing tracks extending in a second direction different from the first direction, and the second cell having a second set of routing tracks extending in the second direction. In some embodiments, the method further includes adjusting a first spacing between an adjacent pair of routing tracks in the first set of routing tracks to be equal to a second spacing different from the first spacing, adjusting a third spacing between an adjacent pair of routing tracks in the second set of routing tracks to be equal to a fourth spacing different from the third spacing, placing at least a first pair of conductive patterns on the first set of routing tracks, placing at least a second pair of conductive patterns on the second set of routing tracks, forming, by a first mask, a first set of conductive structures based on the first pair of conductive patterns, and forming, by a second mask, a second set of conductive structures based on the second pair of conductive patterns. In some embodiments, the first cell and the second cell have a same cell height in the first direction, the same cell height is a non-integer multiple of a minimum pitch, a top boundary and a bottom boundary of the first cell overlap a pair of the first set of routing tracks, a top boundary and a bottom boundary of the second cell overlap a pair of the second set of routing tracks.

Another aspect of this description relates to a system of manufacturing an integrated circuit. In some embodiments, the system includes a non-transitory storage medium encoded with a set of instructions, and a hardware processor coupled with the non-transitory storage medium and configured to execute the set of instructions. In some embodiments, the set of instructions is configured to cause the hardware processor to receive a layout including a first standard cell abutting a second standard cell, the first standard cell abutting the second standard cell along a first direction, each of the first standard cell and the second standard cell having a plurality of routing tracks extending along a second direction perpendicular to the first direction. In some embodiments, the set of instructions is configured to further cause the hardware processor to adjust a first spacing between an adjacent pair of routing tracks in the plurality of routing tracks in the first standard cell to be equal to a second spacing different from the first spacing, and place at least a first pair of conductive patterns on the plurality of routing tracks in the first standard cell. In some embodiments, the first standard cell and the second standard cell have a same cell height in the first direction, the same cell height is a non-integer multiple of a minimum pitch, and a top boundary and a bottom boundary of the first standard cell and a top boundary and a bottom boundary of the second standard cell overlap the plurality of routing tracks.

Still another aspect of this description relates to a system of manufacturing an integrated circuit. In some embodiments, the system includes a non-transitory storage medium encoded with a set of instructions, and a hardware processor coupled with the non-transitory storage medium and configured to execute the set of instructions. In some embodiments, the set of instructions is configured to cause the hardware processor to generate a first layout including a first standard cell, the first standard cell having a first set of routing tracks extending in a first direction. In some embodiments, the set of instructions is configured to further cause the hardware processor to generate a second layout including a second standard cell, the second standard cell having a second set of routing tracks extending in the first direction, and being separated from the first set of routing tracks in a second direction different from the first direction, the first standard cell neighboring the second standard cell. In some embodiments, the set of instructions is configured to further cause the hardware processor to adjust at least a routing track of the first set of routing tracks, the first set of routing tracks having at least two different spacings between adjacent routing tracks of the first set of routing tracks. In some embodiments, the set of instructions is configured to further cause the hardware processor to adjust at least a routing track of the second set of routing tracks, the second set of routing tracks having at least two different spacings between adjacent routing tracks of the second set of routing tracks, place at least a first pair of conductive patterns on the first set of routing tracks, and color the first pair of conductive patterns. In some embodiments, the first standard cell has a first height between a first top boundary and a first bottom boundary of the first standard cell, the first top boundary and the first bottom boundary overlap a pair of the first set of routing tracks, the second standard cell has a second height between a second top boundary and a second bottom boundary of the second standard cell, the second top boundary and the second bottom boundary overlap a pair of the second set of routing tracks, and at least the first height or the second height is a non-integer multiple of a minimum pitch.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing an integrated circuit, the method comprising:
   generating a layout of a first cell and a second cell, the first cell abutting the second cell in a first direction, the first cell having a first set of routing tracks extending in a second direction different from the first direction, and the second cell having a second set of routing tracks extending in the second direction;
   adjusting a first spacing between an adjacent pair of routing tracks in the first set of routing tracks to be equal to a second spacing different from the first spacing;
   adjusting a third spacing between an adjacent pair of routing tracks in the second set of routing tracks to be equal to a fourth spacing different from the third spacing;
   placing at least a first pair of conductive patterns on the first set of routing tracks;
   placing at least a second pair of conductive patterns on the second set of routing tracks;
   forming, by a first mask, a first set of conductive structures based on the first pair of conductive patterns; and
   forming, by a second mask, a second set of conductive structures based on the second pair of conductive patterns;
   wherein the first cell and the second cell have a same cell height in the first direction, the same cell height is a non-integer multiple of a minimum pitch, a top boundary and a bottom boundary of the first cell overlap a pair of the first set of routing tracks, a top boundary and a bottom boundary of the second cell overlap a pair of the second set of routing tracks.

2. The method of claim 1, wherein the first cell is symmetric to the second cell about the bottom boundary of the first cell or the top boundary of the second cell.

3. The method of claim 1, further comprising:
performing optical proximity correction on the layout.

4. The method of claim 1, further comprising:
coloring at least the first pair of conductive patterns or the second pair of conductive patterns.

5. The method of claim 1, wherein the first set of conductive structures and the second set of conductive structures are formed to have a vertex or a rectangular shape.

6. The method of claim 1, wherein the first set of conductive structures and the second set of conductive structures are formed by using a second metal layer process.

7. The method of claim 1, wherein the first set of routing tracks is symmetric to the second set of routing tracks about the bottom boundary of the first cell or the top boundary of the second cell.

8. The method of claim 1, wherein a center line of a conductive pattern of the first pair of conductive patterns is aligned with a routing track of the first set of routing tracks.

9. A system of manufacturing an integrated circuit, comprising:
a non-transitory storage medium encoded with a set of instructions; and
a hardware processor coupled with the non-transitory storage medium and configured to execute the set of instructions, the set of instructions being configured to cause the hardware processor to:
receive a layout including a first standard cell abutting a second standard cell, the first standard cell abutting the second standard cell along a first direction, each of the first standard cell and the second standard cell having a plurality of routing tracks extending along a second direction perpendicular to the first direction;
adjust a first spacing between an adjacent pair of routing tracks in the plurality of routing tracks in the first standard cell to be equal to a second spacing different from the first spacing; and
place at least a first pair of conductive patterns on the plurality of routing tracks in the first standard cell;
wherein the first standard cell and the second standard cell have a same cell height in the first direction, the same cell height is a non-integer multiple of a minimum pitch, and a top boundary and a bottom boundary of the first standard cell and a top boundary and a bottom boundary of the second standard cell overlap the plurality of routing tracks.

10. The system of claim 9, wherein the set of instructions is configured to further cause the hardware processor to:
adjust a third spacing between an adjacent pair of routing tracks in the plurality of routing tracks in the second standard cell to be equal to a fourth spacing different from the third spacing.

11. The system of claim 10, wherein the set of instructions is configured to further cause the hardware processor to:
place at least a second pair of conductive patterns on the plurality of routing tracks in the second standard cell.

12. The system of claim 11, wherein the set of instructions is configured to further cause the hardware processor to:
color the first pair of conductive patterns and the second pair of conductive patterns.

13. The system of claim 9, wherein the set of instructions is configured to further cause the hardware processor to:
perform optical proximity correction to the layout.

14. The system of claim 9, wherein the first standard cell is symmetric to the second standard cell about the bottom boundary of the first standard cell or the top boundary of the second standard cell.

15. A system of manufacturing an integrated circuit, the system comprising:
a non-transitory storage medium encoded with a set of instructions; and
a hardware processor coupled with the non-transitory storage medium and configured to execute the set of instructions, the set of instructions being configured to cause the hardware processor to:
generate a first layout including a first standard cell, the first standard cell having a first set of routing tracks extending in a first direction;
generate a second layout including a second standard cell, the second standard cell having a second set of routing tracks extending in the first direction, and being separated from the first set of routing tracks in a second direction different from the first direction, the first standard cell neighboring the second standard cell;
adjust at least a routing track of the first set of routing tracks, the first set of routing tracks having at least two different spacings between adjacent routing tracks of the first set of routing tracks;
adjust at least a routing track of the second set of routing tracks, the second set of routing tracks having at least two different spacings between adjacent routing tracks of the second set of routing tracks;
place at least a first pair of conductive patterns on the first set of routing tracks; and
color the first pair of conductive patterns;
wherein the first standard cell has a first height between a first top boundary and a first bottom boundary of the first standard cell, the first top boundary and the first bottom boundary overlap a pair of the first set of routing tracks, the second standard cell has a second height between a second top boundary and a second bottom boundary of the second standard cell, the second top boundary and the second bottom boundary overlap a pair of the second set of routing tracks, and at least the first height or the second height is a non-integer multiple of a minimum pitch.

16. The system of claim 15, wherein the set of instructions configured to cause the hardware processor to adjust at least the routing track of the first set of routing tracks comprises the set of instructions being configured to further cause the hardware processor to:
divide the first height by the minimum pitch to thereby determine a quotient of a whole number;
generate a predetermined number of pitch options based on the whole number; and
determine a set of spacings by the predetermined number of pitch options, the set of spacings including the two different spacings between the adjacent routing tracks of the first set of routing tracks.

17. The system of claim 15, wherein the set of instructions configured to cause the hardware processor to adjust at least the routing track of the first set of routing tracks comprises the set of instructions being configured to further cause the hardware processor to:
compare a sum of a first set of spacings to the first height, the first set of spacings being between each pair of routing tracks of the first set of routing tracks, and the first set of spacings including the two different spacings between the adjacent routing tracks of the first set of routing tracks;
determine whether the first set of routing tracks is symmetric along the second direction; and determine whether the first set of routing tracks violates a design rule.

18. The system of claim 17, wherein the set of instructions configured to cause the hardware processor to adjust at least the routing track of the first set of routing tracks comprises the set of instructions being configured to further cause the hardware processor to:
- select N pitches for spacings between adjacent tracks in an arithmetic sequence by adding the minimum pitch to a common difference M, N being a positive integer from 2 to 5, and M being different from N,
- when the first set of routing tracks is not symmetric along the second direction,
- when the first set of routing tracks violates the design rule, or
- when the sum of the first set of spacings is different from the first height.

19. The system of claim 17, wherein the hardware processor is configured to repetitively perform the compare the sum of the first set of spacings to the first height, the determine whether the first set of routing tracks is symmetric along the second direction, and the determine whether the first set of routing tracks violates the design rule in an iterative manner.

20. The system of claim 15, wherein the set of instructions is configured to further cause the hardware processor to:
- perform an optical proximity correction on the first layout and the second layout.

\* \* \* \* \*